United States Patent Office 3,763,054
Patented Oct. 2, 1973

3,763,054
PROCESS FOR THE PRODUCTION OF MICRO-
POROUS POLYURETHANE(UREA)SHEET STRUC-
TURES PERMEABLE TO WATER VAPOR
Artur Reischl and Dieter Dieterich, Leverkusen, and
Harro Witt, Hackenbroich, Germany, assignors to
Farbenfabriken Bayer Aktiengesellschaft, Leverkusen,
Germany
No Drawing. Continuation-in-part of application Ser. No.
723,929, Apr. 24, 1968. This application Dec. 7, 1970,
Ser. No. 95,960
The portion of the term of the patent subsequent to
Nov. 23, 1988, has been disclaimed
Int. Cl. B29d 27/08; C08g 22/00, 53/08
U.S. Cl. 260—2.5 AY                    7 Claims

ABSTRACT OF THE DISCLOSURE

Microporous sheet structures are prepared by converting aqueous dispersions of polyurethane polymers having salt-type groups into sheet structures and melt sintering the structures. The dispersions are sedimenting and redispersible, the particles having an average particle size above about $5\mu$. The products of the invention are useful as artificial leather in the preparation of raincoats, handbags, belts, shoes, upholstery and also as vibration and sound damping materials.

This appliction is a continuation-in-part of copending application Ser. No. 723,929, filed Apr. 24, 1968 and now abandoned.

This invention relates to microporous sheets of polyurethane(urea) polymers and to a process for preparing the same. More particularly, it relates to an improved method of preparing microporous sheets that simulate leather.

It is already known to produce aqueous dispersions of polyurethanes that have ionic groups. These are generally applied in thin layers, e.g. by the methods employed for the application of lacquers. Quick-drying, homogeneous films or coatings are obtained in this manner. The average particle size of these polyurethane latices is generally below $2\mu$ and preferably even below $0.5\mu$. Occasionally, the microstructure of the sheets obtained from these latices is still heterogeneous at room temperature but the sheets practically always become impermeable to water vapor when elevated temperatures are employed.

It is also already known to produce microporous sheet structures impermeable to water vapor from isocyanates. These sheet structures have the common feature that they are produced from the organic phase, for example, by coagulation of isocyanate polyaddition products from dimethylformamide solutions or by spraying polyurethane solutions, easily volatile organic solvents being used for the purpose.

It is an object of this invention to provide microporous sheet structures. It is another object to provide an improved process for making microporous sheet structures. It is a further object to provide microporous sheet structures that correspond to natural leather with regard to permeability to water vapor.

The foregoing objects and others which will become apparent from the following description are accomplished in accordance with this invention, generally speaking, by providing microporous sheet structures that are permeable to water vapor from aqueous polyurethane(urea) dispersions or suspensions containing salt-type groups that are sedimenting and redispersible or capable of being resuspended and have an average particle size greater than $5\mu$ and preferably 8 to $100\mu$, converting these dispersions or suspensions into sheet structures, and sintering the structure at temperatures between about 60 and about 220° C. during or after the shaping process. Especially suitable are polyurethane ureas that have a weight average molecular weight of over 20,000, preferably over 100,000, and a Shore hardness A of 30 to 98 in the solid homogeneous form. The weight average molecular weight limitation on the preferred polyurethane ureas correspond to a tensile strength at a weight average molecular weight of 20,000 of 10 kg. wt./cm.$^2$ up to a tensile strength at a weight average molecular weight of 100,000 of 50 kg. wt./cm.$^2$ as determined according to IUP 6 (IUP=International Union for Physical Testing) published, e.g. in "Das Leder" 1959, 14–18.

Thus, the invention is accomplished by providing a process for the production of sheet structures from aqueous dispersions of polyurethane(ureas)s containing salt-type groups, which polyurethane(ureas)s have a weight average molecular weight above 20,000 and preferably above 100,000, which correspond to a tensile strength of above 10 kg. wt./cm.$^2$, preferably above 50 kg. wt./cm.$^2$ and, when in solid homogeneous form a Shore A hardness of 30 to 98, wherein a sedimenting and redispersible aqueous polyurethane(urea) dispersion having an average particle size above $5\mu$ is converted into sheet structures by known processes and melt sintered at temperatures between 60 and 220° C. during or after shaping. The general expression "dispersion" employed in this context is intended also to include suspensions.

Polyurethane latices that have an average particle diameter of more than $5\mu$ practically always tend to sediment. In the process, the particles usually stick together to form opaque layers or coagulate so that the dispersions are irreversibily destroyed.

The production of sedimenting and redispersible aqueous polyurethane(urea) dispersions may, for example, be effected by reacting polyurethanes and/or polyurethane ureas that have ionic groups and free isocyanate groups with polyamines and/or hydrazines in the presence of water and dispersing them.

According to a preferred embodiment, the solutions of the isocyanate-containing ionic polyisocyanate addition product in a suitable solvent such as acetone, ethyl acetate, methyl ethyl ketone, tetrahydrofuran, benzene or methylene chloride and the polyamine or hydrazine dissolved in water are added together with stirring and the organic solvent is distilled off. If the solvent used is dimethylformamide, the polyurethane(urea) can be precipitated with water and suitable aqueous pastes can be obtained by decanting or suction filtration. Suitable polyamines are in principle any organic amines which have a total of at least two primary and/or secondary amino groups.

Redispersible coarse polyurethane(urea) latices suitable for use according to the invention can also be obtained if in the course of their preparation intralaticular cross-linking takes place with the aid of reactive groups, i.e. if suitable polyurethane(urea)s are reacted with bi- and polyfunctional compounds that are capable of salt formation or cross-linking so that cross-linking takes place within the individual particles.

In order to obtain the desired coarse polyurethane (urea) dispersions by internal cross-linking, di- or polyfunctional cross-linking agents may be added either to the organic solution or to the aqueous dispersion of the polyurethane(urea)s, different types of cross-linking agents being suitable according to the chemical nature of the polyurethane(urea)s employed. Suitable combinations of functional groups in the ionic polyurethane(urea)s that have not been cross-linked, and suitable cross-linking agents for this purpose, are indicated in the following table.

| Functional groups in the non-cross-linked polyurethane (urea) | Cross-linking agent |
|---|---|
| —CO—NH—R, —NH—CO—NH—R, —NH—NH—R, —OH, —NH$_2$, (—O—CO—NH—R). | Polyisocyanates, isocyanate splitters, uretdiones, formaldehyde, formaldehyde splitters, methylol ethers, etc., polyaziridines, divinylsulphone. |
| —N— | Quaternizing agents, polyacids. |
| —S— | Quaternizing agents. |
| —CH=CH$_2$ | Sulphur, $S_2Cl_2$, if indicated with vulcanization accelerators, peroxides, aliphatic azo compounds. |
| —COOH, —SO$_3$H, —HPO$_4$ (-) | Polybases, oxides, hydroxides, carbonates of polyvalent metals. |
| —NH$_2$, —COOH | Polyepoxides. |

The incorporation of such functional groups in the high molecular weight polyurethane(urea) is carried out by known processes, in particular by the use of suitable chain lengthening agents such as diamines, water, hydrazine, carboxylic acids, dimethylol dihydropyran and bis-hydroxyethylallylamine. If the polyurethane(urea) is rendered cationic by a quaternizing reaction, functional groups may, for example, also be introduced subsequently by means of the quaternizing agent. Suitable quaternizing agents are, for example, chloroacetamide, bromoethanol, chloroacetic hydrazide, allyl bromide and bromoacetic acid.

Slowly reacting cross-linking agents may be added before the dispersion of the (dissolved) polyurethane (urea). In that case they are also dispersed as ionic polyurethane(urea) serves as an emulsifier. Very fast acting cross-linking agents, especially compounds that react as ions, such as polyacidic and polybasic materials must in some cases be added to the dispersion subsequently.

The possibility also frequently exists of incorporating the cross-linking agent right from the start as a monofunctional compound in the polyurethane(urea) composition. Thus, for example, polyfunctional quaternizing agents may be used or included in minor portions in the quaternization, approximately one function thereof reacting with the high molecular weight polyurethane(urea) with alkylation. The second function reacts only subsequently in the formed latex particles, with cross-linking.

Methylol ethers can also easily be incorporated for example:

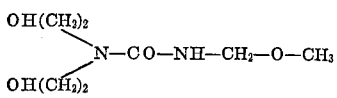

or as

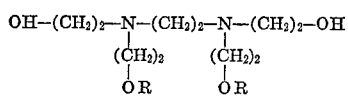

or as chloroacetamide methylolether.

By choice of suitable pairs of cross-linking and acceptor groups and adjusting the preparation of the dispersion to this, it is possible to control the time and extent of cross-linking within the latex particles. Polyurethane(urea)s that are hydrophilic and therefore thoroughly solvated in the latex particles undergo spontaneous cross-linking less readily than coarse particles which have not swelled. Accordingly, cross-linking can also be achieved by converting a finely divided, stable latex capable of spontaneous cross-linking into coarse particles by the addition, for example, of coagulating agents such as acids, bases, salts, polyelectrolytes or flocculating agents. In the case of systems that are based on formaldehyde cross-linking, cross-linking can also be achieved by lowering the pH. The intralaticular particle cross-linking can be achieved by heating the latex, for example, to 80° C.

Since intralaticular cross-linking takes place in the heterogeneous system, it cannot be demonstrated by the usual method, for example, by viscosity control. It can, however, be followed very accurately by removing latex samples at certain times and diluting these with a solvent, e.g. tetrahydrofuran or dimethylformamide.

Latices obtained from particles that are not cross-linked dissolve with considerable increase in viscosity. Viscosity is especially high at the beginning of the cross-linking reaction but then falls again with increasing cross-linking. At the same time, the dilute latex remains cloudy since the cross-linked particles can no longer become unravelled. Highly cross-linked latices can be diluted with dimethylformamide without significant change in appearance and viscosity.

For the preparation of ionic cross-linked polyurethane (urea) dispersions which according to the invention are suitable for the production of microheterogeneous and especially microporous sheets or shaped articles, organic solutions of known nonionic polyurethane(urea)s which contain small quantities of an ionic polyurethane as emulsifier may also be used for the aqueous dispersion which is subsequently to be prepared. Quite generally, ionic polyurethanes are excellent emulsifiers for aqueous dispersions of the usual nonionic polyurethane(ureas)s. Surprisingly, even additions of as little as 0.2 to 4 percent of an ionic polyurethane to a conventional polyurethane (urea) solution impart remarkable dispersibility in water, resulting in eminently satisfactory coarse, unstable heterogeneous systems that have excellent redispersibility. Such unstable systems are especially suitable according to the invention as suspensions or pastes for the production of microporous sheets.

Emulsification may, for example, be effected by mixing the emulsifier with an organic solution of the polyurethane(urea) which is to be emulsified and then stirring water into this, or alternatively the organic phase can be stirred into the aqueous phase. The ionic, generally water-soluble-(colloidal) polyurethane may, of course, also be added at the start to the aqueous phase. Efficient stirrers, especially those that exert a powerful shearing effect, assist the dispersing process and lead to the formation of nonspherical elongated or fibrous particles which are especially valuable for the production of microporous sheet structures with good mechanical properties. It should, however, be mentioned that dispersion can in principle also be carried out with simple mixing apparatuses.

Of particular interest are emulsifiers which contain cross-linkable reactive groups in the molecule. Thus, for example, water-soluble polyurethanes that contain quaternary ammonium nitrogen and in addition contain methylol ether, epoxy, aziridine or masked isocyanate groups in the molecule can be used as emulsifiers for dispersing nonionic polyurethanes.

In this way, the dispersed polyurethane particles contain reactive groups exclusively on their surface, which reactive groups exert a topochemical reaction between the surfaces of the particles during the subsequent sintering process, so that solvent resistant sheet structures are obtained.

For dispersion of polyurethane(urea) compositions, which may be in solution, one may also use conventional low molecular weight or higher molecular weight emulsifiers such as fatty alcohol sulphonates, long chained alkyl ammonium salts, hydroxylated alcohols, etc. In that case, however, high speed stirrers are required and the organic phase should be added to the aqueous phase and not conversely.

If highly reactive cross-linking systems are used, and especially cross-linking agents which react in the presence of water, the chemical process of cross-linking in many cases cannot be separated in time from the dispersing process. This applies especially to the process of dispersing polyurethane(urea)s that still contain free isocyanate groups.

As a result, when NCO-containing polyurethane-(urea)s that are not water-soluble as colloids are converted into the aqueous phase, latex particles that are cross-linked to a greater or less extent are obtained which, depending on the special method of dispersion selected in the individual case, can either be isolated or combined to agglomerates. Individual particles are generally obtained in cases where an NCO-containing polyurethane-(urea) mass is dispersed with the aid of emulsifiers and/or the organic polyurethane(urea) phase is added to the aqueous phase with the aid of a high speed stirrer.

Latices of agglomerates of cross-linked particles are obtained especially when polyurethane(urea) masses which contain cationic or ionic NCO groups and which are in the form of solutions in organic solvents are converted into an aqueous dispersion by the addition of water.

At least partial cross-linking during the dispersion process may also occur in the presence of reactive groups other than isocyanate groups which are especially effective, for example in the process of dispersing polyurethane(urea)s that also contain quaternizing and quaternizable groups and which because of a small amount of salt-type groups are capable of forming relatively compact particles in water.

According to another, not yet known process, polyisocyanate polyaddition products that do not contain any groups capable of salt formation, especially high molecular weight and optionally slightly cross-linked products of this type, present in the form of a solution in organic solvents, may be converted by means of polyurethanes which contain groups capable of salt formation into sedimenting, redispersible aqueous dispersions. The last mentioned salt-type polyurethanes exert a specific emulsifying effect so that they are effective at concentrations of 0.5 percent by weight and upwards. For example, special high molecular weight polyisocyanate polyaddition products, e.g. those mentioned in Belgian patent specification No. 664,870 and in German patent specification No. 1,225,381, may be dissolved in a solvent such as acetone, methyl ethyl ketone or tetrahydrofuran, and the polyurethane that is capable of salt formation and suitable for emulsification may be added before salt formation, in solid or dissolved form, and salt formation may then be effected by the addition of acids or bases with stirring, and lastly the desired quantity of water may be added to the organic solution. The organic solvent is removed by distillation, if desired under reduced pressure. The type of the mechanical agitation of the reaction mixture used has an influence both on the particle size and the particle shape of the resulting aqueous, redispersible polyurethane dispersion.

In principle, such dispersions may also be produced by other variations of the process, for example the polyurethane(urea) dissolved in an organic solvent may be combined in organic solution with the polyurethane(emulsifier) which is already present in the salt form, and the mixture may be diluted with water and the solvent distilled off. Alternatively, the ionic polyurethane may be placed in the reaction vessel in the aqueous phase and the organic solution or the hot melt of the polyurethane-(urea) mass may be added. In this procedure, special care must be taken to insure sufficiently fine distribution of the organic phase. This can be achieved, for example, by using high speed stirrers or ultrasonics or by injecting the organic phase through nozzles. Another embodiment consists, for example, in dissolving the polyurethane emulsifier which contains salt groups in water, and adding the aqueous solution of the ionic polyurethane dropwise to the organic solution of the polyurethane(urea).

In all the methods mentioned, the polyurethanes which are capable of salt formation are preferably synthesized in such a way that they have the structure of block polymers, i.e. the salt groups are not distributed uniformly in the macromolecule but concentrated in hydrophilic blocks. This block structure can be achieved, for example, by synthesizing the polyurethane mass from nonionogenic, apolar, higher molecular weight polyhydroxyl compounds and low molecular weight salt-type isocyanates or low molecular weight isocyanates which are capable of salt formation, and/or chain lengthening agents.

The ionic polyurethane(urea)s may, for example, contain the following groups:

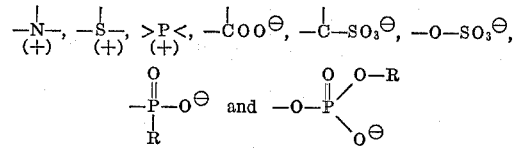

The process according to the invention is based on the surprising observation that special coarse-disperse polyurethane(urea)s that are described in detail above only partially stick together at the boundary surfaces at temperatures of about 60 to about 220° C., preferably 100 to 180° C., and in the resulting sheet structures, micropores are formed which are substantially uniformly distributed and communicate with each other by very fine, irregular channels.

The polyurethane(urea)s containing salt-type groups can be prepared according to German Patents Nos. 1,184,-946, 1,178,586, 1,179,363, German Auslegeschrift No. 1,097,678, Belgian Patents Nos. 653,223, 658,026, 636,799, 663,102, British Patent No. 883,568, French Patent No. 1,108,75 and United States Patent No. 3,213,049.

Stable polyurethane dispersions may be obtained by the above-mentioned prior art processes, i.e. dispersions in which the particles have average particle diameter below $2\mu$ or even below $0.5\mu$. These dispersions or colloidal solutions are useful as ionic emulsifier for non-ionic polyurethanes in the process already described to produce sedimenting dispersions.

In order to obtain sedimenting and redispersible dispersions by the above-mentioned prior art it is useful to apply one or more of the following measures:

(1) Incorporation of particularly low quantities of salt-type groups, e.g. 0.01–0.1 percent  0.03–0.5 percent —$SO_3^-$, that is quantities which are no longer sufficient for the production of stable dispersions.

(2) Addition of electrolytes, e.g. neutral salts, acids, bases and also polyelectrolytes or electrolyte generators, e.g. acid chlorides or sulphuric acid esters.

(3) The use of slightly polar solvents such as acetone, methyl ethyl ketone, methylene chloride, carbon tetrachloride benzene or toluene.

(4) Stirring the organic or aqueous organic polyurethane solution into water (in order to achieve finely divided dispersions, the procedure should be reversed).

(5) The use of only very small amounts of emulsifiers, insufficient to obtain a stable latex and simultaneously an amount of chain-lengthening diamine less than equivalent to the NCO-groups of the prepolymer being emulsified by the prepolymer-emulsifier-process.

The polyurethane(urea) polymers may be prepared by reacting organic compounds containing active hydrogen atoms that are reactive with NCO groups and having a molecular weight of from about 300 to about 4000 with organic polyisocyanates and if desired chain extending agents. Any suitable compound containing active hydrogen atoms may be used, such as, for example, polyesters, polyethers, polyacetals, polyhydric polythioethers and the like.

Any suitable hydroxyl polyester may be used such as, for example, the reaction product of a polycarboxylic acid and a polyhydric alcohol. Any suitable polycarboxylic acid may be used in the preparation of the hydroxyl polyester such as, for example, adipic acid, succinic acid, sebacic acid, suberic acid, oxalic acid, methyl adipic acid, glutaric acid, pimelic acid, azelaic acid, phthalic acid, terephthalic acid, isophthalic acid, thiodipropionic acid, maleic acid, fumaric acid, citraconic acid, itaconic acid and the like. Any suitable polyhydric alcohol may be used the reaction with the polycarboxylic acid to form a polyester such as, for example, ethylene glycol, propylene glycol, butylene glycol, neopentyl glycol, amylene glycol, hexanediol, bis-(hydroxymethylcyclohexane) and the like. Of course, the hydroxyl polyester may contain urethane groups, urea groups, amide groups, chalkogen groups and the like. Thus, the hydroxyl terminated polyester includes, in addition to hydroxyl terminated polyesters, also hydroxyl terminated polyester amides, polyester urethanes, polyetheresters and the like. Any suitable polyester amide may be used such as, for example, the reaction product of a diamine or an amine alcohol with any of the compositions set forth for preparing polyesters. Any suitable amine may be used such as, for example, ethylene diamine, propylene diamine, tolylene diamine and the like.

Any suitable amino alcohol such as, for example, b-hydroxy ethyl-amine and the like may be used. Any suitable polyester urethane may be used such as, for example, the reaction of any of the above-mentioned polyesters or polyester amides with a deficiency of an organic polyisocyanate to produce a compound having terminal hydroxyl groups. Any of the polyisocyanates set forth hereinafter may be used to prepare such compounds.

Any suitable polyetherester may be used as the organic compound containing terminal hydroxyl groups such as, for example, the reaction product of an ether glycol and a polycarboxylic acid such as those mentioned above, with relation to the preparation of polyesters. Any suitable ether glycol may be used such as, for example, diethylene glycol, triethylene glycol, 1,4-phenylene-bis-hydroxy ethyl ether, 2,2'-diphenyl propane 4,4'-bis-hydroxy ethyl ether and the like.

Any suitable polyhydric polyalkylene ether may be used such as, for example, the condensation product of an alkylene oxide with a small amount of a compound containing active hydrogen containing groups such as, for example, water, ethylene glycol, propylene glycol, butylene glycol, amylene glycol, trimethylol propane, glycerine, pentaerythritol, hexanetriol and the like. Any suitable alkylene oxide condensate may also be used such as, for example, the condensates of ethylene oxide, propylene oxide, butylene oxide, amylene oxide and mixtures thereof. The polyalkylene ethers prepared from tetrahydrofuran may be used. The polyhydric polyalkylene ethers may be prepared by any known process such as, for example, the process described by Wurtz in 1859 and in the "Encyclopedia of Chemical Technology," volume 7, pages 257–262, published by Interscience Publishers in 1951 or in United States Patent No. 1,922,459.

Any suitable polyhydric polythioether may be used such as, for example, the reaction product of one of the aforementioned alkylene oxides used in the preparation of the polyhydric polyalkylene ether with a polyhydric thioether such as, for example, thiodiglycol, 3,3'-dihydroxy propyl sulfide, 4,4'-dihydroxy butyl sulfide, 1,4-(b-hydroxy ethyl) phenylene dithioether and the like.

Any suitable polyacetal may be used such as, for example, the reaction product of an aldehyde with a polyhydric alcohol. Any suitable aldehyde may be used such as, for example, formaldehyde, paraldehyde, butyraldehyde and the like. Any of the polyhydric alcohols mentioned above with relation to the preparation of hydroxyl polyesters may be used.

Any suitable chain extending agent containing active hydrogen atoms which are reactive with NCO groups and having a molecular weight less than abou. 300 may be used such as, for example, water, ethylene glycol, propylene glycol, butylene glycol, 1,4-butanediol, butenediol, butynediol, xylylene glycol, amylene glycol, neopentyl glycol, 2,3-butanediol, 1,4-phenylene-bis-(b-hydroxy ethyl ether), 1,3-phenylene-bis-(b-hydroxy ethyl ether), bis-(hydroxy methyl-cyclohexane), hexanediol, diethylene glycol, dipropylene glycol and the like; poly- amines such as, for example, ethylene diamine, propylene diamine, butylene diamine, hexamethylene diamine, cyclohexylene diamine, phenylene diamine, tolylene diamine, xylylene diamine, 3,3'-dichlorobenzidene, 3,3'-dinitrobenzidene, 4,4' - methylene-bis-(2-chloroaniline), 3,3'-dichloro-4,4'-biphenyl diamine, 2,6-diaminopyridine, 4,4'-diamino diphenyl methane, and the like; alkanol amines such as, for example, ethanol amine, aminopropyl alcohol, 2,2-dimethyl propanol amine, 3-amino cyclohexyl alcohol, p-amino benzyl alcohol and the like; water, hydrazine, substituted hydrazines such as, for example, N,N'-dimethyl hydrazine, 1,6-hexamethylene-bis-hydrazine, carbodihydrazide, hydrazides of dicarboxylic acids and disulfonic acids such as adipic acid dihydrazide, oxalic acid dihydrazide, isophthalic acid dihydrazide, thiodipropionic acid dihydrazide, tartaric acid dihydrazide, 1,3-phenylene disulfonic acid dihydrazide, omega-aminocapronic acid dihydrazide, gamma-hydroxy butyric hydrazide, bis-semi-carbazide, bis-hydrazine carbonic esters of glycols such as any of the glycols heretofore mentioned and the like. The reaction may also be carried out in the complete absence of these low molecular weight compounds.

Any suitable organic diisocyanate may be used in reaction with the organic compound containing active hydrogen atoms such as, for example, ethylene diisocyanate,
ethylidene diisocyanate,
propylene diisocyanate,
butylene diisocyanate,
hexamethylene diisocyanate,
cyclopentylene-1,3-diisocyanate,
cyclohexylene-1,4-diisocyanate,
cyclohexylene-1,2-diisocyanate,
2,4-toluylene diisocyanate,
2,6-toluylene diisocyanate,
dimeric toluylene diisocyanate,
4,4'-diphenylmethane diisocyanate,
2,2-diphenyl propane-4,4'-diisocyanate,
p-phenylene diisocyanate,
m-phenylene diisocyanate,
xylylene diisocyanate,
1,4-naphthylene diisocyanate,
1,5-naphthylene diisocyanate,
diphenyl-4,4'-diisocyanate,
azobenzene-4,4'-diisocyanate,
diphenylsulphone-4,4'-diisocyanate,
dichlorohexamethylene diisocyanate,
furfurylidene diisocyanate,
1-chlorobenzene-2,4-diisocyanate
and the like.

The products of the process according to the invention have very satisfactory physical properties combined with a permeability to water vapor corresponding to that of natural leather. This is especially remarkable since before the melt sintering process, sheets obtained from aqueous dispersions only constitute very loosely intermeshing felted particles in spite of the removal of water. These sheets can usually be reconstituted into useful dispersions by mixing them with water. From this it follows that the high quality of the sintered polyurethane(urea) foils is unexpectedly achieved exclusively by the effect of temperature.

It is a technical advantage that the products can be shaped by known application processes, for example by casting, spreading with wiper applicators or spraying the aqueous, coarsely disperse polyurethane(urea) dispersions. These polyurethane(urea) dispersions can be applied especially easily in the form of about 30 to 60 percent pastes by casting. Conversion into the form of a paste by means of the usual commercial thickening agents which should be added in quantities of up to 20 percent, preferably up to 10 percent to obtain the desired viscosity reduces the sedimentation rate to an extent depending upon the concentration. Highly concentrated pastes having a solids content of about 45 to 65 percent by weight, for example, can be kept for days without phase separation occurring.

It is also possible to produce sheets from aqueous polyurethane(urea) dispersions by first partly or completely removing the water from the aqueous dispersion, for example by spray drying or by suction and drying on drums, and then spreading out the resulting polyurethane(urea) powder over a surface at any time thereafter, and melt sintering. However, this method is complicated as regards both the production of the sheets and the technique of application. In particular, it is extremely difficult to produce by this method thin foils of a layer thickness of 200µ that have the smooth surface that is usually required. By contrast, the production of sheets from aqueous polyurethane(urea) dispersions according to the invention is much more advantageous.

The properties of the polyurethane(urea)s to be used according to the invention can be modified by the addition of (graft co)polymers in aqueous phase or in powder form. Suitable polymers for this purpose are, for example, polyvinyl chloride, polyvinylidene chloride, polyvinyl acetate, ethylene-vinyl acetate copolymers which may, if desired, be (partly) saponified and/or grafted with vinyl chloride, and styrene-butadiene copolymers. (Graft co)polymers should only be added in amounts of up to 20 percent by weight, based on the total mixture, in order not to jeopardize the temperature stability that is usually desired, although higher polymer contents, say up to 50 percent based on the total quantity, can, of course, be used. The water content of the polyurethane(urea) particles is of great importance for the sintering process. With decreasing water content, the sintering temperature must be increased in order to achieve comparable results. The length of time for which the temperature acts as well as the thickness of the foil and in some cases also the application of pressure during the sintering process are other important factors which have a marked influence on the microporosity, permeability to water vapor and physical properties of the products of the process of the invention.

Sheets of 100 and 400µ in thickness, for example, can be sintered by temperature shock, the time required varying from only a few seconds in the case of foils that are substantially free from water to a few minutes in the case of sheets that are still slightly moist, the time required depending upon the amount by which the sintering temperature exceeds the so-called "sticking point."

The "sticking point" can be determined by leaving a strip of polyurethane(urea) foil that has not yet been sintered on the temperature scale of a Kofler bench for one minute and then lifting it off with forceps up to the point where the foil has stuck to the bench. The lowest temperature at which the strip of foil sticks is regarded as the "sticking point."

Good sintering conditions are found in a temperature range of about 10 to 40° C. above the "sticking point." The sintering times required are usually 1 to 10 minutes.

For production of the microporous sheet structures according to the invention, one may also, according to the invention, apply the polyurethane(urea) dispersions by the so-called direct process onto a porous substrate which will also subsequently serve as the support. Examples of such substrates are woven or knitted textiles, fleeces, felts, foam plastic foils, e.g. polyurethane foam plastic foils, or split leather.

Ordinary commercial adhesives can be used to improve the adhesion but care must always be taken to insure that no coherent layer will be formed on the substrate.

In the so-called reverse process, a support is used from which the microporous polyurethane(urea) sheets are stripped off. At the earliest, the foils can be stripped when the product of the process has sufficient load bearing capacity and tensile strength. It is therefore advisable to remove most of the water at elevated temperature and to heat the sticking point at least for a short time.

The supports used for the reverse process may be porous or impervious. Suitable supports are, for example, paper, cardboard or ceramic material, sheet steel, glass or silicone-rubber matrices. To obtain very smooth surfaces, thin metal foils are also suitable as supports. The sheets which have been produced by the reverse process and which may be applied at any desired time to a porous support are bonded in the usual manner by means of noncoherent layers of adhesive.

After the sintering process, the surface of the products can be ground and provided with a finish in known manner.

Dyes and pigments may, of course, also be applied in the usual manner.

The products of the process are suitable, e.g. for use in the production of tent sheets, raincoats, handbags, belts, vibration damping materials, shoe shafts, upholstery materials, car upholstery and wallpaper.

The invention will be further illustrated by the following examples in which parts are by weight unless otherwise specified.

Preparation of the isocyanate polyaddition products as the starting material for the aqueous polyurethane dispersions (Recipe see Table 1)

Method I (Prepolymer process).—In an apparatus equipped with stirrer, the given quantity of polyisocyanate is added to the dehydrated, hydroxyl-containing polyester or polyether at 80 to 130° C. and stirred for about 10 minutes (30 to 60 minutes in the case of a polyether that contains secondary hydroxyl groups). The chain lengthening agent is then allowed to react at suitable temperatures, depending on the activity, so that the final temperature if possible does not exceed about 200° C. A temperature range of 120 to 170° C. is usually employed. If indicated, the reaction mixture is after-heated at about 80 to about 110° C. for up to about 10 hours to complete the reaction.

The reaction product cooled to room temperature is granulated and brought into solution. A heterogeneous organic system with colloid and gel contents is usually obtained which can be worked up like a true solution.

Method II (One-stage process).—An anhydrous mixture of the hydroxyl-containing high and low molecular weight compounds indicated in the table, heated to 60 to 130° C., is intimately mixed with the given quantity of polyisocyanate. The reaction temperature rises according to the reactivity of the polyisocyanate, to which a catalyst may have been added, up to about 200° C. If necessary, the product is poured into containers and after-heated at about 100° C. until the isocyanate content is below 2 percent by weight, preferably below 0.3 percent by weight. If desired, the isocyanate content may also be reduced by means of catalysts by boiling under reflux during the subsequent dissolution operation.

The disintegrated material is converted as in Method I into a solution or a microgel.

Description of a technical experimental plant for the continuous production of the starting material according to Method I The hydroxyl-containing, anhydrous polyester or polyether is stored in a heatable container and injected into an injection premixing chamber through a heatable Bosch pump. By means of another Bosch pump, the polyisocyanate is dosed via an injection nozzle into the injection premixing chamber where the said reactants are intimately mixed.

In a heating coil which is arranged to follow the mixing chamber and which can be heated with steam but can also be cooled to regulate the temperature (capacity 5 to 10 liters, maximum steam temperature 185°), the prepolymer continuously flowing through it reacts with exclusion of air.

The chain lengthening agent is conveyed by means of a gear wheel pump into a mixing head equipped with porcupine stirrer (delivery from below upwards) and combined with the preadduct.

The polyurethane flows out of the mixing head either into an aluminum container with closable lid (capacity 25 to 30 kg.) or preferably on to a conveyor band.

Description of a technical experimental plant for Method II

The procedure is in principle the same as in the preceding description but without the preaddition reaction in the reaction tube, the preheated reactants being combined directly in a mixing head.

Method III (Prepolymer solution process, chain lengthening with diamine).—In the case of the polyurethane urea lengthened with diamine, high molecular weight polyurethane ureas are obtained within a short time even if the chain lengthening reaction takes place in solution at temperatures above about 60° C., the diamine being preferably provided in the form of a solution.

about 229.5 parts of hexamethylene diisocyanate-(1,6). A solution of about 45 parts of N-methyldiethanolamine and about 100 parts of the adduct of 1 mol of methoxymethylisocyanate and 1 mol of diethanolamine is added at about 70° C. The reaction mixture is stirred at about 60° C. until there is no further rise in viscosity, about 900 parts by volume of acetone are added, the mixture is again stirred until there is no further rise in viscosity, about 900 parts by volume of acetone are again added, the mixture is again stirred until the viscosity is constant, and it is then diluted with about 474 parts by volume of acetone, a 40 percent solution is obtained.

Preparation of the polyurethane(urea) dispersions as starting material for the process according to the invention Method A.—The dilute quaternizing agent or acid is gradually added at about 50° C. to the solution in an organic solvent of the isocyanate polyaddition product (see table) and the polyurethane which is capable of salt formation or quaternization, and the reaction mixture is stirred for 10 to 20 minutes. The quantity of water required for the desired end concentration is then added

TABLE 1

| 1 | 2 | 3 | 4 | 5 | 6 | 7 | 8 |
|---|---|---|---|---|---|---|---|
| I | 73.34 I | 22.50 D 44 | 4.16 B | I | 15 THF | | |
| II | 70.15 I | 24.75 D 44 | 5.10 B | II | 10 THF | | |
| III | 70.27 I | 24.42 D 44 | 4.83 B | I | 10 THF | 0.40 | 0.48 TMP/T |
| IV | 69.91 I | 24.63 D 44 | 5.46 B | I | 10 THF | | |
| V | 67.00 I | 26.84 D 44 | 6.16 B | II | 10 THF | | |
| VI | 52.80 I | 28.25 D 44 | 18.95 BM | III | 20 THF | | |
| VII | 56.50 I<br>28.20 II | 12.70 H | 2.60 B | II | 20.0 THF | | |
| VIII | 54.70 III | 35.56 D 44 | 9.74 B | I | 20.0 THF | | |

NOTE.—Figures given in parts by weight:
Column 1=Example number.
Column 2=Higher molecular weight polyesters and polyethers containing hydroxyl end groups— (a) Adipic acid polyesters or mixed polyesters having the following glycol components: I=Hexanediol:2,2-dimethylpropanediol-(1,3) in the ratio of 22:12; OH number 62, acid number 1.3; II=Ethylene glycol; OH number 56, acid number 1— (b) Polyether: III=Poly(hydroxypropylene)glycol, OH number 56.
Column 3=Diisocyanates: D44=Diphenylmethane-4,4'-diisocyanate; H=Hexamethylene-1,6-diisocyanate; T=2,4- and 2,6-toluylenediisocyanate isomeric mixture 65:35.
Column 4=Chain lengthening agent: B=1,4-butanediol; BM=4,4'-bis-(N-methylamino)-diphenylmethane.
Column 5=Methods of preparation of the polyisocyanate polyaddition product: I=Prepolymer process; II=One stage process; III=Prepolymer solution process (diamine lengthening).
Column 6=Concentration (percent) and nature of solvent: THF= Tetrahydrofuran.
Column 7=Free isocyanate content based on solids content of the solution (Column 6).
Column 8=Other additives: T=Dibutyltin-IV-dilaurate; 0.1 percent based on solid polyurethane; TMP=1 1 1-trimethylolpropane.

Preparation of the emulsifier polyurethanes capable of salt formation as starting material for the process according to the invention (see Table 3, column 3)

I

About 750 parts of the mixed polyester of adipic acid and a glycol mixture of 1,6-hexanediol:2,2-dimethylpropanediol-(1,3) in the ratio of 22:12, OH number 62 and acid number of 1.3, are reacted for about 2 hours at about 110° C. with about 152.5 parts of hexamethylene diisocyanate-(1,6). About 45 parts of N-methyldiethanolamine in about 600 parts by volume of acetone and 2 drops of dibutyl tin dilaurate are added to the viscous mass at about 70° C. The solution is stirred for about 24 hours at about 60° C., about 900 parts by volume of acetone are added, the mixture is again stirred for about 12 hours at about 60° C. and diluted with about 600 parts by volume of acetone. A 36 percent polyurethane solution is obtained.

II

About 750 parts of the polyisocyanate used according to I are reacted for about 2 hours at about 110° C. with continuously or in several portions dropwise, and the organic solvent is distilled, if desired under reduced pressure, until part of the water has distilled off. The aqueous polyurethane(urea) dispersion specified in Table 2 remains behind in the reaction vessel. If desired, the polyurethane dispersion is filtered through a wire screen (mesh about 300 to 500μ) to remove very coarse agglomerates.

Method B.—Water and the acid are placed in a vessel equipped with stirrer, and a solution mixture consisting of the isocyanate polyaddition product and the polyurethane which is capable of salt formation is added dropwise under the conditions indicated in the table, and the procedure is then continued according to Method A.

Method C.—Only water is placed in a vessel equipped with stirrer, and a mixture of the isocyanate polyaddition product and the ionic polyurethane (emulsifier) is added at 40 to 60° C. and the procedure is otherwise in accordance with Method A.

Quaternization (e.g. with dimethyl sulphate) of the polyurethane capable of salt formation (preparation of emulsifier) is effected by stirring the reactants for 30 minutes at 20 to 60° C.

TABLE 2.—POLYURETHANE (UREA) DISPERSIONS

| 1 | 2 | 3 | 4 | 5 | 6 | 7 | 8 | 9 |
|---|---|---|---|---|---|---|---|---|
| 1 | 300 I | 42 II | 39 DMS plus 39 ES | A | 700 | 37 | Finely divided | 150 |
| 2 | 2,000 II | 24 II | 24 DMS plus 20 ES | A | 500 | 21 | Coarsely divided | 135 |
| 3 | 1,000 III | 11 II | 22 PA | A | 270 | 30 | Coarse | 148 |
| 4 | 1,000 IV | 12 II | 24 PA | B | 300 | 28 | Fine | 132 |
| 5 | 1,000 V | 12 II | 14 MAA | A | 300 | 27 | Finely divided | 148 |
| 6 | 2,000 VI | 24 II | 45 PA | C | 500 | 27 | ...do... | 160 |
| 7 | 1,770 VII | 42 II | 84 PA | A | 900 | 32 | ...do... | 94 |
| 8 | 300 VIII | 42 I | 39 DMS plus 37 ES | A | 600 | 26 | ...do... | 105 |
| 9 | 1,000 VIII | 50 I | 38 DMS plus 40 ES | A | 280 | 46 | Very finely divided | 180 |

NOTE.—Figures given in parts by weight:
Column 1=Example number.
Column 2=Solution of the nonionic, nonquaternizable polyisocyanate polyaddition product, if required with additions (Table 1).
Column 3=Polyurethane capable of salt formation or quaternizable, in solution in acetone. Quantities based on solid substance. See example above.
Column 4=Salt-forming components: DMS=Dimethylsulphate, 1 percent solution in THF; AA= Acetic acid, 1 percent aqueous solution; PA=Phosphoric acid, 1 percent solution in water/ THF in the ratio of 15:85; MAA=Monochloroacetic acid, 1 percent THF solution.
Column 5=Method of dispersion.
Column 6=Quantity of water in parts by volume.
Column 7=Concentration (solids content) of the optionally filtered (Screen of 500µ mesh), aqueous polyurethane (urea) dispersion.
Column 8=Particle size of the sedimenting but redispersible dispersion.
Column 9=Sticking point (° C.) of the dried polyurethane powder (Kofler bench).

PROCESS ACCORDING TO THE INVENTION

Examples 1–9

The polyurethane (urea) dispersions indicated in Table 2 are poured on to earthenware plates according to DIN 18155 and dried at about 20° C. below the sintering temperature but at about 110° C. at the most. The microporous sheets are lifted very carefully from the plates to avoid subsequent sticking during sintering. In this condition, the sheets do not as yet have any useful physical properties but merely constitute lightly intermeshed felted particles that have a fibrous structure. The products are therefore sintered on glass plates in the dry state under the conditions indicated in Table 3 and tested without a substrate.

TABLE 3.—MELT SINTERING OF THE POLYURETHANE(UREA) FOILS

| Experimental product of dispersion Table 2=Ex.— | Sintering Temperature (° C.) | Sintering Time (min.) | Foil thickness (min.) | Density[1] (g./cm.²) | Tensile strength DIN 53504 (kg.wt./cm.²) | Elongation on tearing DI 53504 (percent) | Permeability to water vapor DIN 53122 (g./m.² day) |
|---|---|---|---|---|---|---|---|
| 1 | 155 | 3 | 0.90 | 0.85 | 8 | 185 | 380 |
| 2 | 135 | 10 | 0.70 | 0.95 | 80 | 230 | 490 |
| 3 | 150 | 5 | 0.75 | 0.45 | 11 | 148 | 459 |
| 4 | 150 | 5 | 0.70 | 0.52 | 12 | 150 | 402 |
| 5 | 145 | 10 | 0.85 | 0.63 | 16 | 225 | 430 |
| 6 | 165 | 15 | 1.25 | 0.73 | 245 | 290 | 755 |
| 7 | 95 | 10 | 0.75 | 0.85 | 13 | 335 | 375 |
| 8 | 125 | 5 | 1.25 | 0.40 | 24 | 385 | 398 |
| 9 | 190 | 3 | 1.35 | 0.85 | 32 | 185 | 345 |

[1] Density of the homogeneous foils 1.25±0.02.

Example 10

About 500 parts of polypropylene ether glycol of molecular weight 2000 are dehydrated for about 30 minutes at about 120° C. and stirred together with about 122.6 parts of 4,4'-diphenylmethane diisocyanate for about one hour at about 90 to about 100° C. About 20 parts of N-methyldiethanolamine in about 400 parts by volume of acetone are added to the mass cooled to about 40° C. After about 4½ hours stirring at about 55° C., the solution has become a tough, viscous mass. It is diluted with about 350 parts by volume of acetone and then stirred for another 2 hours. About 200 parts of the viscous polyurethane solution are stirred together with a solution of about 2.8 parts of 1,3-dimethyl-4,6-bis-chloromethylbenzene in about 50 parts by volume of acetone for about 2 hours. About 4 parts by volume of glacial acetic acid and about 300 parts by volume of water are then added with vigorous stirring. During the addition of water, the solution passes over into a milky white, coarse suspension. After removal of the acetone by distillation, the particles of the suspension (diameter about 90µ) are insoluble in dimethylformamide. The suspension sediments on standing but can be redispersed at any time simply by stirring it up. The suspension is poured on to a porous support (clay plate) where it forms a white layer which easily crumbles. The layer is heated at about 120 to about 130° C. for about 30 minutes, a soft foil with high ultimate tensile strength and high permeability to water vapor being formed which can easily be lifted from the support. Density $d=0.9$ g./cc.

Example 11

About 160 parts of a polyester diol of phthalic acid, adipic acid and ethylene glycol in the molar ratio of 1:1:2.2 of molecular weight 1580, are melted at about 70° C. and stirred together with about 44.7 parts of tolylene diisocyanate (ratio of 2,4- to 2,6-isomers 65:35) for about one hour at about 95 to about 105° C. After cooling to about 55° C., about 79 parts of acetone (water content 0.2 percent), about 16 parts of N-methyldiethanolamine and again about 69 parts of acetone are added in succession. The reaction mixture is stirred for about 80 minutes at about 50° C. until the viscosity is about 15 poises/25° C., and a solution of about 4.9 parts of 1,3-dimethyl-4,6-bis-chloromethylbenzene in about 23 parts of acetone is then added. About 63 parts of acetone are added after a further 10 minutes, and the solution is stirred until the viscosity has again risen to about 15 poises/25° C. About 0.3 part of dibutylamine in about 3 parts by volume of acetone is then added.

About 140 parts by volume of water at about 70° C. are then added in the course of about 30 minutes, with stirring, to about 200 parts of the solution, and the coarse suspension formed is stirred for about 10 hours while the acetone is distilled off. A sedimenting suspension of spherical particles of diameters between 20 and 80µ is obtained which can be redispersed at any time by stirring or shaking.

The white, microporous but still very loose layer formed when the suspension is poured on to a porous support can easily be triturated between the fingers and on the addition of water it is reconverted into a polyurethane suspension. After-heating at about 120° C. leads to a material of high tensile strength which can be lifted from the support and is dimensionally stable in water. Its density is below 1; the permeability to water vapor is satisfactory.

Example 12

The procedure is the same as in Example 11 but about 5.5 parts of 85 percent phosphoric acid in about 20 parts by volume of water are added to the polyurethane solution before the addition of water, and the reaction mixture is then stirred together with cold water at room temperature.

A course, redispersible suspension is again obtained, the particles of which have diameters between 5 and $10\mu$ and are insoluble in dimethylformamide.

The suspension can easily be filtered through a suction filter lined with ordinary filter paper. On drying at room temperature, a white, microporous polyurethane layer is obtained which can be strengthened at 80° C., when it becomes microporous.

Example 13

The procedure is the same as in Example 12 but the polyurethane polyphosphate solution is stirred together with warm water at 50 to 60° C. A thick, opaque, aqueous colloidal solution is obtained which is freed from acetone under vacuum.

About 200 parts of the resulting finely divided, thick, completely stable latex which has a solids content of 45 percent and dissolves in dimethylformamide to form an almost clear solution are diluted with about 200 parts of water and mixed within 15 minutes with a solution of about 2 parts of sodium sulphate in about 100 parts of water with vigorous stirring. The dispersion is converted into a fine coagulate within about 2 hours. The stiff, coagulated mass is stirred together with water in an ordinary mixing apparatus, an unstable, fluid dispersion being formed. The irregular particles of agglomerate are insoluble in tetrahydrofuran and have diameters of the order of $100\mu$. On drying, a layer is formed which is white even when dry and which already has a certain initial solidity owing to felting of the particles. Temperature treatment at 100° C. leads to the formation of a flexible, tear-resistant foil with formation of microporosity.

Example 14

Preparation of starting material A.—About 750 parts of a mixed ester of adipic acid, hexanediol-(1,6) and neopentyl glycol (molar ratio 16:11:6); OH number 62, acid number 1.3, are dehydrated under vacuum and reacted for about 2 hours at about 110° C. with about 132.5 parts of hexamethylene diisocyanate (1,6). About 40.1 parts of diethylene glycol in about 600 parts by volume of acetone (water content 0.24 percent) and about 4 drops of dibutyl tin dilaurate are added to the viscous mass at about 70° C. The reaction mixture is stirred at about 60° C. until the viscosity of the solution no longer rises (15 hours), and the solution is diluted with about 900 parts by volume of acetone. After another 8 hours' stirring, about 600 parts by volume of acetone are again added.

A 36 percent polyurethane solution is obtained which forms a thermoreversible subsidiary valency gel at room temperature.

Preparation of starting material B.—About 750 parts of the mixed polyester used above are reacted for about 2 hours at about 110° C. with about 132.5 parts of hexamethylene diisocyanate-(1,6). About 45 parts of N-methyldiethanolamine in about 600 parts by volume of acetone and about 2 drops of dibutyl tin dilaurate are added to the viscous mass at about 70° C. The solution is stirred for about 24 hours at about 60° C., treated with about 900 parts by volume of acetone, again stirred for about 12 hours at about 60° C., and diluted with about 600 parts by volume of acetone. About 47.6 parts of dimethylsulphate are added to the solution for complete quaternization. A 36 percent polyurethane solution is obtained.

About 150 parts of A and about 50 parts of B are mixed, and 100 parts by volume of water are added in the course of about 10 minutes with stirring, and organic solvent is removed under vacuum. A white, coarse particled polyurethane dispersion is obtained which rapidly sediments and can easily be redispersed. About 100 parts of the freshly stirred up suspension are vigorously shaken with about 50 parts of water and about 7 parts of 2,4-tolylene diisocyanate. The viscosity rises and a stirrable paste is formed, the particles of which are insoluble in 10 times the quantity of tetrahydrofuran or dimethylformamide.

The loose, white microporouse layer formed when the suspension is poured on to an earthenware plate is sintered at 120 to 140° C. to form a firm material which is permeable to water vapor.

Example 15

The procedure is the same as in Example 14 but about 400 parts of A and about 10 parts of B are used. The particles of the resulting paste are slightly coarser than those of Example 14 and are also insoluble in dimethylformamide. In order to make the paste fluid, a further 50 parts of water are worked in.

The loose, white, microporous layer formed when the paste is spread on a fleece is sintered at 120 to 140° C. to form a firm material which is permeable to water vapor.

Example 16

About 500 parts of the mixed polyester used in Example 5 are dehydrated under vacuum and treated at about 60° C. with about 162.5 parts of 4,4'-diphenylmethane diisocyanate. The mixture is then stirred for about 30 minutes at about 100° C. When the viscous mass has cooled to about 70° C., about 312 parts by volume of acetone, about 39.0 parts of N-methyldiethanolamine and again about 274 parts by volume of acetone, about 15.25 parts of 1,3-dimethyl-4,6-bis - chloromethylbenzene in about 90 parts by volume of acetone, and again about 305 parts by volume of acetone are added successively to it. After one hour stirring at 50 to 55° C., the solution has become viscous. Any isocyanate groups still present are converted into urea groups by the addition of about 2 parts of dibutylamine in about 30 parts by volume of acetone.

The viscous solution has a polyurethane content of 47.5 percent and is stable for several hours when stored.

About 760 parts of the solution are stirred together with a solution of about 3.0 parts by volume of 85 percent phosphoric acid in about 30 parts by volume of water, as a result of which the vsicosity rises. To the solution heated to about 50° C., about 650 parts by volume of water at about 20° C. are added with stirring within about 10 minutes. The acetone is then distilled off under vacuum. A coarse, 35 percent suspension is obtained, the particles of which are insoluble in dimethylformamide. The suspension rapidly sediments. The sediment can easily be redispersed, even after several months, simply by stirring it with a glass rod. A 75 percent paste is easily obtained by decanting. If a stirring speed of about 100 to 200 revs./min. is maintained during the addition of water and the distillation, the particles obtained are predominantly nonspherical with a transverse diameter of about 20 to $90\mu$ and a diameter in the longitudinal direction of 100 to $1000\mu$.

The paste is painted on a cotton fabric in a thickness of 0.5 mm. and dried at about 50° C. The coated paste is then heated treated at about 130° C. This sinters the paste and produces a strengthened material, the original microporosity of which is largely preserved A laminate is obtained which is tear-resistant and abrasion-resistant and has good permeability to water vapor.

Example 17

The paste described in Example 16 is diluted with water to a solids content of about 20 percent and poured as a thin layer on earthenware. The dry polyurethane layer about 0.2 mm. in thickness cannot be removed because it is not sufficiently strong. After a heat treatment at about 120° C., a very firm, slightly translucent foil is obtained which is permeable to water vapor.

Example 18

About 500 parts of a polyester of hexanediol-(1,6) neopentyl glycol and adipic acid (OH number 67) which has been dehydrated at 15 mm. Hg and 130° C. are stirred together with about 114.3 parts of 1,6-hexamethylene-diisocyanate for about 2 hours at temperatures between 110 and 120° C. The mixture is left to cool and a solution of about 4 parts of N-methyldiethanolamine in about 20 parts by volume of acetone is added at a bath temperature of about 60° C., and the mixture is stirred for another 2 hours and diluted with about 100 parts by volume of acetone. The acetone contains 0.22 to 0.25 percent water. The reaction mixture is then quaternized with about 3.12 parts by volume of dimethylsulphate and diluted with another 50 parts by volume of acetone.

The solution of about 5.6 parts by volume of diethylene triamine in about 900 parts by volume of water is run in at a bath temperaure of about 60° C. with stirring. After removal of the acetone by distillation, an approximately 44 percent aqueous dispersion of particles of about 10 to 15μ that are insoluble in dimethylformamide is obtained, which particles agglomerate to form larger particles. The dispersion settles but can be redispersed by shaking.

By pouring this dispersion on to supports and leaving it to dry, a microporous sheet structure is obtained (sticking point about 170° C.) the mechanical properties of which can be substantially improved by tempering, as indicated in the table which follows:

The sheets have a density of 0.847, corresponding to a pour volume of about 24 percent.

The permeabilities to water vapor (according to DIN 53122) are in the region of 1.8 mg./cm.$^2$ per hour for layer thicknesses of 0.8 to 1 mm.

| Number | Time | Temperature, °C. | T 100 | EB | EB |
|---|---|---|---|---|---|
| 0 | 1 week | 20 | | 6.8 | 65 |
| 1 | 300 minutes | 80 | | 10.4 | 90 |
| 2 | 15 minutes | 120 | 12.6 | 14 | 130 |
| 3 | 15 minutes | 130 | 14.3 | 19.8 | 210 |
| 4 | 150 minutes | 100 | 16.0 | 20.8 | 170 |
| 5 | 300 minutes | 100 | 15.2 | 38.6 | 560 |

NOTE.—The test was carried out according to DIN 53455 on standard test rods according to DIN 53504 at 22° C. and 44 percent atmospheric moisture:

T 100=tension at 100% elongation [kg. wt./cm.$^2$]; EB=elongation at break [kg. wt./cm.$^2$]; EB=elongation at break percent. The permanent elongations are too small to measure.

What is claimed is:

1. A method for making a microporous shaped article which is permeable to water vapor which comprises applying to a substrate a sedimenting and redispersible aqueous dispersion of particles of a polyurethane containing cationic or anionic salt-type groups and having a tensile strength of, in a solid homogeneous form, more than 10 kg. wt./cm.$^2$, and a hardness when in a solid homogeneous form of Shore A 30 to 98, the particles having an average particle size above about 5 microns, removing the water and heating the resulting coating of dispersion to a temperature of from about 60° C. to about 220° C. to melt sinter the particles of the dispersion together with micropores therebetween.

2. The process of claim 1 wherein the polymer is a polyurethane urea polymer.

3. The process of claim 1 wherein the polymer has a tensile strength of more than 50 kg. wt./cm.$^2$.

4. The process of claim 1 wherein the dispersions are comprised of predominantly nonspherical particles of an average transverse particle diameter of 8 to 100μ and an average longitudinal particle diameter of 20 to 2000μ.

5. The process of claim 1 wherein the dispersion contains from about 0 to about 20 percent by weight based on the total weight of the polymers of a polymer of vinyl chloride or vinyl acetate.

6. The process of claim 1 wherein polyvinyl chloride, polyvinylidene chloride, polyvinyl acetate, ethylene vinyl acetate copolymers, saponified ethylene vinyl acetate copolymers, graft copolymers of vinyl chloride onto ethylene vinyl acetate copolymers and styrene butadiene copolymers in the form of aqueous dispersions or powders are added to the aqueous polyurethane dispersion in an amount of from about 0 up to about 20 percent by weight based on the total weight of the polymers.

7. The product of the process of claim 1.

References Cited

UNITED STATES PATENTS

| | | | |
|---|---|---|---|
| 2,692,873 | 10/1954 | Langerak et al. | 260—77.5 AB |
| 2,899,411 | 8/1959 | Schollenberger | 260—77.5 AP |
| 3,296,016 | 1/1967 | Murphy | 264—49 X |
| 3,100,721 | 8/1963 | Holden | 264—Dig. 13 |
| 3,213,049 | 10/1965 | Heiss | 260—29.2 TN |
| 3,491,050 | 1/1970 | Keberle et al. | 264—41 UX |
| 3,622,527 | 11/1971 | Dieterich et al. | 264—41 X |

PHILIP E. ANDERSON, Primary Examiner

U.S. Cl. X.R.

117—62, 63, 161 KP; 161—159, 160, 164; 260—77.5 Q, 859; 264—41, 126, 331, Dig. 62, Dig. 77

UNITED STATES PATENT OFFICE
CERTIFICATE OF CORRECTION

PATENT NO. : 3,763,054
DATED : October 2, 1973
INVENTOR(S) : Artur Reischl; Dieter Dieterich; Harro Witt It is certified that error appears in the above—identified patent and that said Letters Patent are hereby corrected as shown below:

The title should be corrected to --Microporous Polyurethane (Urea) Sheet Structures Permeable to Water Vapor and a Process for the Production Thereof--

Column 1, line 7, correct the name of the assignee to read --Bayer Aktiengesellschaft--; same column, line 11, insert --claims priority, Application Germany P 16 94 147.2, April 28, 1967--;

Column 4, line 63, "hydroxylated" should be corrected to --hydroxyethylated--;

Column 11, Table 1, in the footnotes for column 8, "111-trimethvlolpropane" should read --1,1,1-trimethylolpropane--

Signed and Sealed this second Day of December 1975

[SEAL]

Attest:

RUTH C. MASON
Attesting Officer

C. MARSHALL DANN
Commissioner of Patents and Trademarks